United States Patent [19]

Pecht et al.

[11] Patent Number: 5,492,341

[45] Date of Patent: Feb. 20, 1996

[54] NON-CONTACTING, GAP-TYPE SEAL HAVING A RING WITH A PATTERNED SEAL FACE

[75] Inventors: Glenn G. Pecht, Vernon Hills; Jon Hamaker, Schaumburg; Peter L. Kay, Arlington Heights, all of Ill.

[73] Assignee: John Crane Inc., Morton Grove, Ill.

[21] Appl. No.: 83,614

[22] Filed: Jun. 28, 1993

Related U.S. Application Data

[63] Continuation-in-part of Ser. No. 839,584, Feb. 21, 1992, abandoned, which is a continuation of Ser. No. 553,397, Jul. 17, 1990, Pat. No. 5,090,712.

[51] Int. Cl.⁶ ..................................................... F16J 15/34
[52] U.S. Cl. ........................... 277/96.1; 277/96; 277/81 R; 384/123
[58] Field of Search .................................. 384/123, 124; 277/96, 96.1, 81 R, 134

[56] References Cited

U.S. PATENT DOCUMENTS

| | | | |
|---|---|---|---|
| 1,699,385 | 3/1923 | Whittingham | 277/96 |
| 3,572,730 | 3/1971 | Otto | 277/96.1 |
| 3,586,340 | 6/1971 | Otto | 277/96 |
| 3,638,957 | 1/1972 | Marsi | 277/96 |
| 3,744,805 | 7/1973 | Heinrich | 277/96 |
| 3,804,424 | 4/1974 | Gardner . | |
| 3,973,781 | 8/1976 | Grorich . | |
| 4,103,907 | 8/1978 | Inouye et al. | 277/96.1 |
| 4,212,475 | 7/1980 | Sedy . | |
| 4,290,162 | 12/1983 | Yanai et al. . | |
| 4,420,162 | 12/1983 | Yanai et al. | 277/96.1 |
| 4,423,879 | 1/1984 | Takenaka et al. . | |
| 4,738,453 | 4/1988 | Ide | 277/96.1 |

(List continued on next page.)

FOREIGN PATENT DOCUMENTS

| | | |
|---|---|---|
| 660610 | 4/1963 | Canada . |
| 298324 | 1/1989 | European Pat. Off. . |
| 0499370 | 8/1992 | European Pat. Off. ............. 277/96.1 |
| 2928504 | 1/1981 | Germany . |
| 207580 | 12/1983 | Japan . |
| 2197396 | 5/1988 | United Kingdom . |

OTHER PUBLICATIONS

"A New Self-Aligning Mechanism for the Spiral-Groove Gas Seal Stability"; J. Sedy, ASME paper presented Oct. 1979.
Spiral, Apr. 1992, "Two Way Groove", pp. 2–3, John Crane International, Cheltenham, England.
John Crane Technical Report TRP 38007 "New John Crane Dry Gas Seal Groove Profile Satisfies Birotational Requirements" John Crane Inc. Mar. 1992.
"Dry Non-Contacting Gas Seals in the Turbomachinery Industry", Industry, Pecht et al, John Crane, Jul. 1992.
T. Lai, "Development of Non-Contacting, Non-Leaking Spiral Groove Liquid Face SEals", John Crane Inc., paper submitted for 1993 STLE/ASME Tribology Conference, New Orleans, La. to be published Oct. 1993.

*Primary Examiner*—William A. Cuchlinski, Jr.
*Assistant Examiner*—Keith Hwang
*Attorney, Agent, or Firm*—Dorn, McEachran, Jambor & Keating

[57] ABSTRACT

A seal face of at least one ring used in a non-contacting, gap-type mechanical end face seal having a pattern including an optional dam and an annular grooved area. The annular grooved area has one of several embodiments, including entrance lands which are essentially triangular and have one side contiguous with one circumferential edge of the annular grooved area. These embodiments further include a set of converging boundary sides of the groove to provide a pressure zone effect. Seal face patterns include a contiguous groove around the circumference of the seal face and a series of annular bands comprising a repeating pattern of an essentially triangular groove interposed between two adjacent, but oppositely oriented, lands. One seal face pattern includes a circular or elliptical groove being open to the circumferential edge, thus providing an entrance land effect, and which includes a circular or elliptical land within it so that the boundaries between the lands and groove converge to provide the pressure zone effect.

20 Claims, 7 Drawing Sheets

U.S. PATENT DOCUMENTS

| | | | |
|---|---|---|---|
| 4,789,250 | 12/1988 | Schluter | 384/305 |
| 5,092,612 | 3/1992 | Victor et al. | 277/96.1 |
| 5,133,562 | 7/1992 | Lipschitz | 277/74 |
| 5,143,384 | 9/1992 | Lipschitz | 277/96.1 |
| 5,201,531 | 4/1993 | Lai | 277/96.1 |
| 5,222,743 | 6/1993 | Goldswain et al. | 277/96.1 |

Fig. 12B. PRESSURE PROFILE

NON-CONTACTING, GAP-TYPE SEAL HAVING A RING WITH A PATTERNED SEAL FACE

RELATED INVENTIONS

This is a continuation-in-part of application Ser. No. 07/839,584, filed on Feb. 21,1992, now abandoned, which is a continuation of Ser. No. 07/553,397, filed Jul. 17, 1990, now U.S. Pat. No. 5,090,712.

BACKGROUND OF THE INVENTION

This invention relates generally to mechanical face seals for sealing the space between a housing and a relatively rotating shaft, and in particular to face seals having shallow grooves in their sealing surfaces for maintaining a gap between the relatively rotating sealing members.

Spiral groove mechanical face seals are used to create a non-contacting seal between a rotating shaft and its housing. A gap between two sealing faces, one of which is rotating with regard to the other, is maintained by a film of pressurized fluid pumped between the faces by spiral grooves in at least one of the sealing faces. Examples of spiral groove face seals are found in U.S. Pat. No. 3,804,424 issued to Gardner and U.S. Pat. Nos. 4,212,475 and 4,290,611 issued to Sedy. All of these patents are commonly assigned to the assignee of the present invention.

The spiral groove face seals described in these patents and generally those in present use include an annular primary sealing ring having a radially extending face in sealing relation with the radially extending face of an annular mating ring. In operation, either the primary ring or the mating ring rotates with the shaft and includes a radial face in sealing relation to the radial face of the other ring which is itself sealed against the housing. In conventional contacting seals, friction between the two faces during relative rotation produces heat, causing seal face deformation, accelerated aging of the seal components and other undesirable conditions.

It has been found that a very narrow gap or space between the relatively rotating radial faces permits a very small amount of the sealed fluid to leak or flow to the low pressure side, but that the fluid leading through between the relatively rotating seal faces provides a convective cooling effect which prevents unwanted heat generation. Such a gap is obtained by a series of spiral grooves in the face of either or both the primary or mating rings which, upon rotation of one of the rings relative to the other, act as a pumping mechanism to force fluid between the seal faces. The fluid flow separates the faces and acts as a film lubricant, maintaining the gap and allowing the faces to slide against one another without contact between them.

Other mechanical face seals utilizing grooved surfaces have been proposed. For example, U.S. Pat. No. 4,420,162 describes a face seal having spiral grooves extending from the inner circumference to the outer circumference that are both forwardly and rearwardly inclined with respect to the direction of rotation of the seal face. One set of either forwardly or rearwardly inclined grooves acts to pump the sealed fluid out of the gap between seal faces while the oppositely inclined set of grooves acts to pump a different fluid into the gap.

These seal face designs, however, do not provide the ideal sealing structure, especially when flexibility in seal design parameters is desired. For example, the seal face spiral groove structure described in U.S. Pat. No. 4,420,162 pumps fluid through the seal in a contacting seal face environment.

Seal faces pumping fluid in only one direction provide a fluid film thickness between the faces that is excessive and results in unwanted and unnecessary leakage. The leakage is somewhat reduced if there is a sealing dam adjacent either the inner or outer diameter of a sealing ring. A sealing dam is an ungrooved annular surface adjacent to the grooved annular surface. Moreover, the asymmetry in the spiral direction of the prior art seal faces permits their rotation in only one direction so as to provide a gap between the faces. Rotation of the shaft in the opposite direction or improper installation of the sealing rings creates a vacuum between the seal faces instead of a gap, and operation of the equipment can seriously damage the seal elements.

As is recognized by Sedy in U.S. Pat. No. 4,212,475, it is desirable to make the fluid film thickness as small as possible to reduce leakage while simultaneously increasing the film stiffness and thus providing stability to the seal faces and gap dimension. The solution proposed by Sedy provides for specific parameters in the length, width and thickness of the grooves relative to the dimensions of the lands and the dam. This solution works well enough when fluid leakage is not a problem, but will nevertheless produce more leakage than is necessary. Also, the seal design of Sedy, U.S. Pat. No. 4,212,475, is restricted to specific parameters such as shaft speed and direction.

This invention is a continuation-in-part of, and claims the benefit of commonly disclosed subject matter with, U.S. Pat. No. 5,090,712. The disclosure of that patent addresses the need for a non-contacting, gap-type seal capable of sealing between a housing and a relatively rotating shaft regardless of the direction of shaft rotation. The seal face pattern disclosed and claimed by U.S. Pat. No. 5,090,712 provides the sealing capability in these types of seals for shaft rotation in either direction. The inventors have invented improvements and other embodiments of seal face patterns which rely on some common principles with those described in U.S. Pat. No. 5,090,712 and, in specific applications, seal fluid and inhibit fluid leakage equally as well or better than the seal face designs of the patent.

SUMMARY OF THE INVENTION

This invention therefore relies on the disclosure found in U.S. Pat. No. 5,090,712 of a bi-directional mechanical face seal and on the series of circumferentially disposed entrance lands defined by having one side of each entrance land coinciding with the edge of the circumference of the seal ring face, a radially extending edge of each entrance land being forwardly inclined and another radially extending edge being rearwardly inclined relative to the direction of rotation of the seal ring. The forwardly and rearwardly inclined sides each define an intersecting angle with the circumferential edge of said seal ring relative to a tangent, each intersecting angle being in a range of from about 5 degrees to about 90 degrees. The intersecting angle of each radially extending edge, which is forwardly inclined relative to the rotation of the shaft of each entrance land provides an entrance effect to said seal ring face upon shaft rotation in either direction.

Also disclosed herein is a mechanical face seal for providing a seal between a pair of relatively rotatable components comprising a first sealing ring adapted to be mounted non-rotatably on one of said components and sealed with respect to said one component, a second sealing ring adapted to be mounted non-rotatably on the other component and sealed with respect to said other component, said second sealing ring being mounted in axial alignment with the first sealing ring, and means being provided for resiliently urging a seal face of the first sealing ring axially into sealing engagement with a seal face of the second sealing ring; at least one of the sealing rings including a seal face comprising one of the following seal face patterns.

An ungrooved dam portion extending inwardly from one circumference of the seal face of at least one of the sealing rings and an annular groove portion having a first and a second periphery defining a radial width W taken in a radial direction between the first and the second periphery, the groove portion comprising at least one continuous groove which is contiguously connected from the first periphery to the second periphery around the complete circumference of the annular groove portion, a plurality of spaced apart first lands disposed around the first periphery of the annular groove portion, each of the first lands being substantially triangular in shape and having at least three triangle sides, each triangle side comprising generally a shallow arc, one of the triangle sides defining a triangle base, which base is coextensive with the first periphery of the annular groove portion and is defined by an arc portion thereof, and an intersection point of the other two triangle sides, the intersection point being opposed along a generally radial direction relative to the triangle base, each of the first lands having a geometrical height $H_1$ as measured along a radius between the base and the intersection point, and a plurality of circumferentially spaced apart second lands disposed around a second periphery of the annular groove portion and being separated from the first lands by the continuous groove, each of the second lands essentially having a quadrilateral shape comprising at least four sides, each of the sides being defined by shallow arcs, a first of the sides being coextensive with the second periphery of the annular groove portion and being defined by an arc section thereof, and a second of the sides being opposed to and generally parallel to the first side and being radially separated therefrom, the second side comprising a shallow arc which is circumferentially disposed, the quadrilateral having a geometrical height $H_2$ defined as the radial dimension between the first and second sides, wherein at least one of the first lands is circumferentially disposed between two of the second lands and wherein the dimensions of the radial width W, and the geometrical heights $H_1$, $H_2$ are as follows:

$H_1>0$;

$H_2>0$; and $W-H_1<H_2$.

In a second embodiment, the seal face pattern includes a generally planar surface extending outwardly from the inner circumference to the outer circumference of the ring face, the surface including at least three concentric annular bands disposed radially sequentially on the seal face, the concentric annular bands comprising a radially inwardly disposed band and at least two annular bands disposed radially outwardly of the radially inwardly disposed band, any two of at least three annular bands being radially adjacent each other, each of the bands including a plurality of circumferentially adjacent, substantially triangular lands, each triangular land having a radially outwardly disposed base side and a relatively inwardly disposed first intersection point of the other two sides, the other two sides being essentially mirror images of each other and being disposed on opposite sides of a radial centerline which is taken through the first intersection point and the axial centerline of the seal face, the triangle base sides of circumferentially adjacent triangular lands in a radially inwardly disposed band being essentially contiguous having a common second intersection point, the first intersection point of the outwardly disposed band being coincident with the second common intersection point of the annular band which is immediately radially inwardly disposed, and an ungrooved dam portion extending from said other circumference of the seal face.

Still another embodiment of this invention includes an ungrooved portion extending inwardly from one of the circumference of the seal face of said at least one ring, and a grooved portion extending from the other circumference of the seal face of at least one ring, the grooved portion including a plurality of discrete semicircular or elliptical grooves being evenly spaced around the grooved portion and separated from each other by a plurality of lands, each semicircular or elliptical groove being open at the other circumference, a locus/loci of the semicircular or elliptical groove being disposed radially inwardly of the other circumference, each groove further comprising within it a circular or elliptical land having a smaller diameter than that of the semicircular groove and being disposed at the inner peripheral section of the groove but not extending to the other circumference of the seal face, the outer peripheral section of the groove having two intersecting points with the other circumference of the seal face, such that each intersection of the groove with the other circumference defining a predetermined arcuate angle with the circumference to provide a fluid entrance effect.

DETAILED DESCRIPTION OF THE PREFERRED EMBODIMENT

Figure 1:
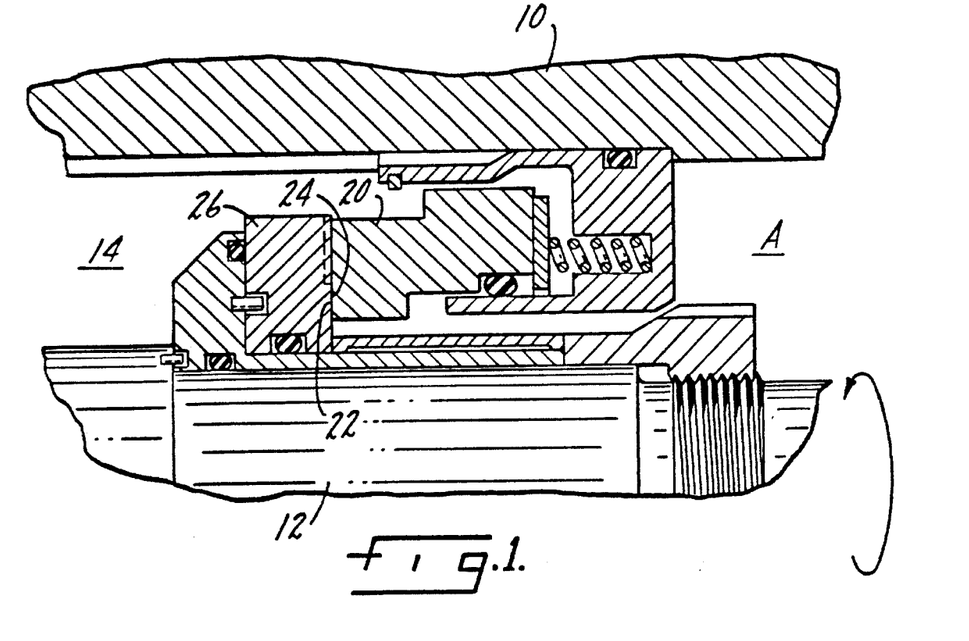
FIG. 1 is a side elevation view in section of a mechanical face seal used in accordance with the present invention.

The environment in which seal faces according to the present invention will be used is depicted in FIG. 1. This environment includes the housing 10 of a compressor (not shown) and a rotating shaft 12 extending through the housing.

The mechanical face seal according to the present invention is used to seal high pressure within the space 14 against leakage to the atmosphere which space is indicated at A.

The basic components of the invention include an annular primary sealing ring 20 having a radially extending face 22 in sealing relation with the radially extending face 24 of an annular mating ring 26.

Details of the structure and operation will be discussed as they relate to the present invention, and reference to U.S. Pat. No. 4,212,475 is recommended for further discussion of mechanical groove seals in general.

In operation, the mating ring 26 rotates with the shaft with its radial face 24 being in sealing relation to the radial face 22 of primary ring 20. Friction between these faces upon relative rotation produces heat. To avoid undue heat generation, the seal operates as a gap type seal, e.g. with a very narrow gap or space between the radial faces 22 and 24 to permit leakage or flow from the space to the lower pressure or atmosphere side, indicated by A.

Figure 2:
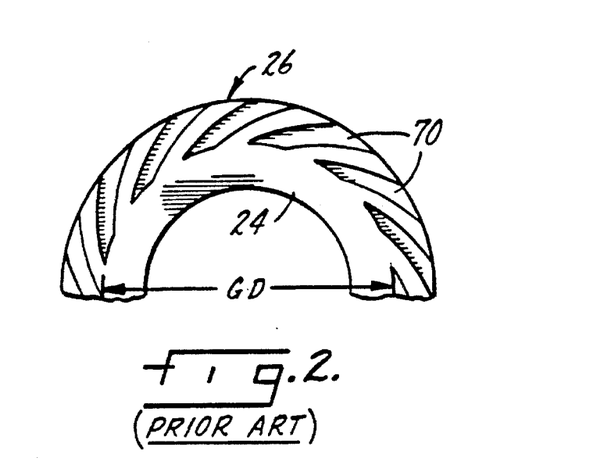
FIG. 2 is an end view of a sealing ring having a conventional spiral groove pattern.

Referring now to FIG. 2, an end view of the sealing face of a conventional ring is illustrated. The particular elements shown in FIG. 2 provide a means for maintaining a gap between the sealing faces of the rings 20 and 26. As is well known in the art, this gap is obtained by forming grooves 70 in the face of either the primary or mating ring. Upon rotation, these grooves act as a pump to force fluid into the gap between the seal faces. The pressure of the fluid separates the faces to provide a small gap between them which causes a small amount of fluid leakage. The fluid leakage is maintained to a desired minimal level by the spiral groove parameters and taking into account the other seal design characteristics. Many of the groove patterns presently used have a spiral design and the seals are therefore known as spiral groove mechanical face seals. The general design considerations for a conventional spiral groove gap-type seal are well known.

The stability of the seal faces depends to a great degree in maintaining a parallel relation between the seal faces relative to each other, as is described in U.S. Pat. No. 4,212,475. Seal stability is in part related to the stiffness of the fluid film between the faces. In the case of spiral groove seals, the stiffness and, therefore, stability increase with decreasing fluid film thickness. It is, therefore, desirable to make film thickness as small as possible. This can be done simply by increasing the seal balance. However, pressure and temperature deflections distort the planar quality of the sealing faces and increase the danger of face contact, face damage, and possible seal destruction. Following the teaching of the present invention, these pressure and temperature deflections are minimized by the unique pattern design of a seal face which is capable of maintaining a very thin but highly stable fluid film thickness which nevertheless maintains the parallelity of the sealing faces.

In the conventional embodiment described in U.S. Pat. No. 4,212,475, a self-aligning feature of that invention obtained parallelity of the seal faces by the dimensioning of three seal parameters within specified ranges. These parameters are (1) depth of the grooves; (2) seal balance; and (3) dam width. For a complete description of the optimum ranges of these parameters, reference to U.S. Pat. No. 4,212,475 is once again recommended. The specification of U.S. Pat. Nos. 4,212,475 and 4,290,611 are herein incorporated by reference where appropriate.

The three parameters described in detail in U.S. Pat. No. 4,212,475 are not exhaustive of the elements and parameters which affect the seal gap, seal gap thickness and seal gap stability. There are approximately 70 parameters which affect the function of a mechanical face seal, and modification of any one of them will necessarily cause a change in the operation of the seal and seal gap. The present invention is directed to a modification of the grooves in the seal face of one of the rings which provides narrower and more stable seal gaps while yet at the same time maintaining fluid stiffness and the separation between the seal faces, and thus preventing contact between the seal faces.

The parent application, Ser. No. 07/553,397, now U.S. Pat. No. 5,090,712, issued Feb. 25, 1992, describes embodiments of the face of the sealing ring having a patterned microdam surface and allowing accomodation of bi-directional rotation of the shaft. The subject matter of U.S. Pat. No. 5,090,712 is herein incorporated by reference, where appropriate.

Figure 3:
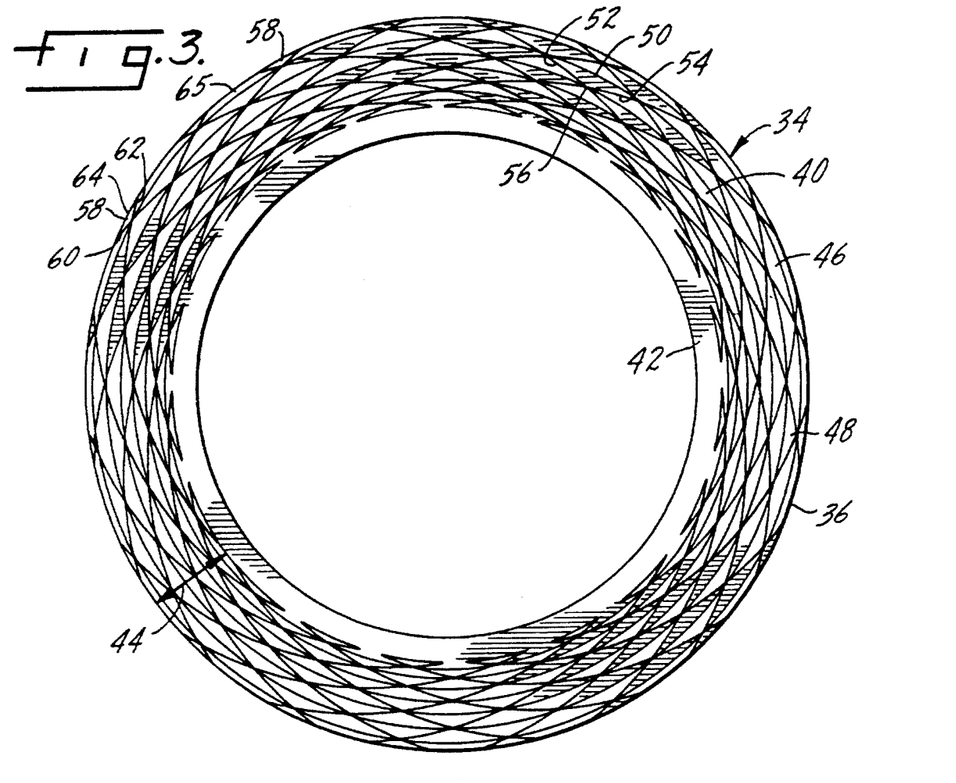
FIG. 3 is an embodiment of a seal face according to the present invention.

Referring now to FIG. 3, a sealing ring 34 includes a seal face 40 comprising an annular dam 42 and a grooved portion 44. Dam 42 is similar to the dam 24 of FIG. 2, and also in the alternative, the dam is not necessary for static sealing, as is discussed above. A dam 42 is preferably desirable because of the pressure buildup effect in the gap between the seal faces 22, 40, as will be explained below.

The annular grooved portion 44 preferably comprises a pattern of grooves and lands which follow two parameters. The lands 46 generally are in the shape of triangles having slightly curved arcs for triangle sides, which are separated by a plurality of grooved areas 48.

Figure 4:
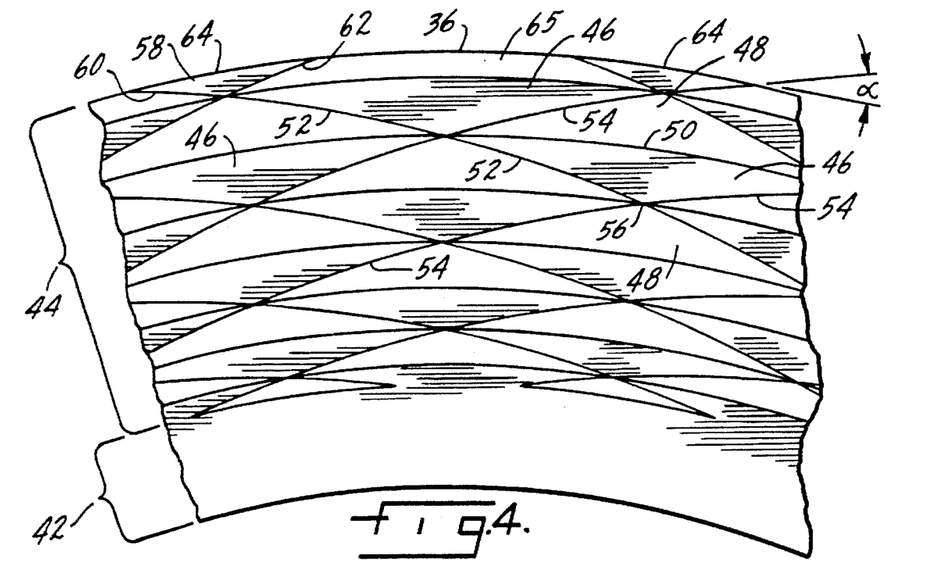
FIG. 4 is a detail view of a portion of the seal face of FIG. 3.

Referring now to FIG. 4, which is a detail of a section of the annular grooved area 44 of FIG. 3, a land 46 is illustrated having a side defining a triangle base 50 which is generally circumferentially disposed. Triangle land 46 further comprises two other sides 52,54 which are slightly curved areas that extend radially inwardly, as well as circumferentially, so that each defines an angle with a circumference of the annular grooved area, and are also angled relative to the radius of the seal face.

As is readily apparent from FIGS. 3 and 4, the triangle bases of circumferentially adjacent lands 46 are coextensive. That is, the base 50 of any land 46 is joined to a base 50 of the next circumferentially adjacent land 46. A circuit of such circumferentially adjacent lands 46 (FIG. 3) will show that the corresponding bases 50 define a circle around the circumference of the annular grooved portion 44 which is concentric with the boundaries thereof.

Each set of plural, circumferentially adjacent lands 46 have triangle bases 50 which contiguously form a set of concentric circular boundaries between the lands 46 and the corresponding adjacent, radially outwardly disposed grooves 48. The net effect is a pattern of annularly disposed lands 46 which form concentric circles or bands of alternating lands 46 and grooves 48, as is seen in FIG. 3.

Another characteristic of the pattern of the annular grooved area 44 relates to the two other sides 52,54 of each land 46. These sides 52,54 extend both radially inwardly and converge circumferentially to meet at a point 56 (see FIG. 4). One set of triangle sides 52 of the plural lands 46 are all forwardly oriented, with respect to one direction of relative rotation of the seal face, and the other set of triangle sides 54 are rearwardly oriented with respect to that direction of relative rotation.

In this embodiment, the point 56 is disposed radially inwardly of the corresponding base 50 of the same land 46.

Each point 56 also defines one terminal point of at least two bases 50 of each of two lands 46 which are in the next radially inward band of lands.

The characteristic pattern derives from disposition of each of the lands 46 in adjacent bands, whether these lands are disposed radially inwardly or radially outwardly-of a particular land 46 in question. Moreover, the triangle sides 52 or 54 of each land 46 also meet identical triangle sides, 52 or 54, respectively, of the radially offset, adjacent lands 46. The juncture of the set of sides 52 are circumferentially and radially disposed so as to follow the path of a spiral from the outer circumferential edge 36 inwardly toward the inner circumferential diameter of the grooved portion of the seal face. Thus, following the path of a side 52 radially inwardly to the corresponding point 56, where it intersects with the side 52 of the next radially inward land 46, and then following that side 52 follows the path of a continuous arc. When taken from the outer diameter of the annular grooved portion 46 to the inner diameter thereof, the continuous arc will provide a spiral line similar to that of the boundary of a conventional spiral groove (see groove 70, FIG. 2).

Another significant feature of the present design, which is also disclosed and claimed in U.S. Pat. No. 5,090,712, are the entrance lands 58 which are adjacent to the outer circumference 36 of the seal ring face 40. The entrance lands of this embodiment are similar to but not identical with the entrance lands of the parent U.S. Pat. No. 5,090,712. Specific differences between the entrance lands 58 of this invention are that the intersection points 56 between side 52 of an entrance land 58 and the sides 52 and base 50 of the first inwardly disposed land 46 has little, if any, width between the entrance groove 65 and the first full groove 48.

The functional characteristics of this pattern provide a number of advantages to a mechanical face seal which, when appreciated, meets a number of stated objectives of the device. First, there is radial symmetry in the groove pattern, as in the seal face patterns disclosed and claimed in U.S. Pat. No. 5,090,712. For purposes of this description, radial symmetry is defined as providing at least one radial line on either side of which appear identical elements which are mirror images of each other. Radial symmetry provides capability of bi-directional rotation to the shaft which the mechanical face seal is intended to seal.

Moreover, and again as in U.S. Pat. No. 5,090,712, this invention relies upon entrance lands 58 at the outer diameter of the seal face 40. The entrance lands 58 serve the function of drawing in fluid externally from the seal outer diameter and impels that fluid inwardly in an entrance effect discussed in column 6 of the parent U.S. Pat. No. 5,090,712, which is relied upon herein.

Each of the entrance lands 58, like the other triangle lands 46, has a leading edge and a trailing edge. The identity of each of these edges 60,62 depends on the direction of relative shaft rotation. An acute angle α is formed between an outer edge forming a triangle base 64 and each of the edges 60,62. As described herein, an angle of two slightly circular arcs is not an exact description, but refers to the angle of the tangents of each of the circular arcs when the tangents are taken at the point of intersection of the arcs.

The acute angle α ideally provides for the function of inwardly impelling or "pumping" the fluid between the surfaces of the seal faces of the two rings which comprise the mechanical face seal (see FIG. 1). A preferred range of values for the acute angle α is between 5° and 90°, and the preferred embodiment will have an acute angle of about 15°.

In the preferred embodiment, the ring having the entrance land will rotate and the edge 60 or 62, depending on shaft rotation direction, will act as a skimmer on the fluid at the high pressure side of the seal to inwardly impel or pump the fluid between the seal faces. As the fluid enters between the seal faces, each subsequent circumferential band of lands 46 will continue to "pump" the fluid radially inwardly because of the angle formed by one of the edges 52,54, depending on shaft rotation direction, of the lands 46 and the resulting direction of travel of the lands 46. The fluid continues to be "pumped" inwardly until it comes up against the dam portion 42, where a distinct pressure "zone" is maintained around the dam portion 42 that is immediately adjacent the grooved portion 44. It is this pressure "zone" which provides the greatest impetus toward maintaining the gap between the seal faces.

The groove opening 65 at the circumferential edge of the seal face 40 and between the ends of the triangle bases 64 of adjacent entrance lands 58 serves as an inlet for the fluid and must have a dimension in relation to triangle base 64 to provide a sufficient flow area. The preferred range of the ratio of the groove opening 65 length to triangle base 64 length should be equal to or greater than 1, the choice of the specific ratio being dependent on speed of rotation, fluid pressure and fluid properties.

Figure 5:
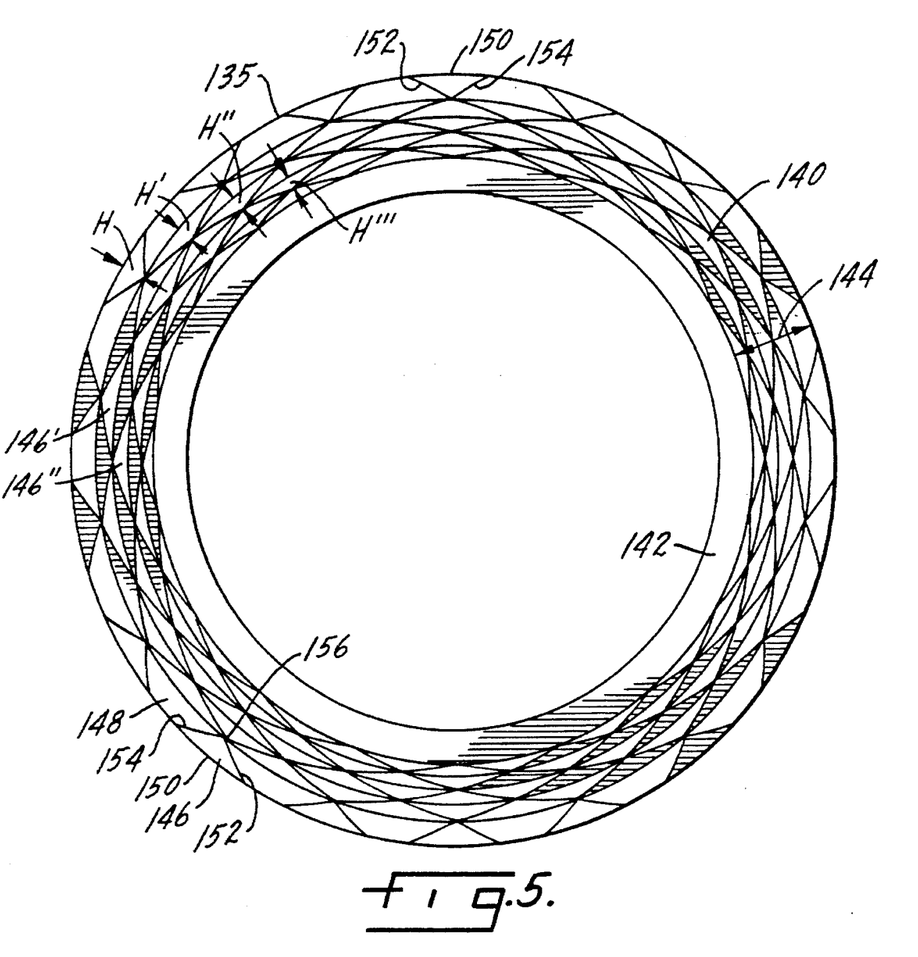
FIG. 5 is another embodiment of a seal face according to the present invention.

FIG. 5 illustrates an alternative embodiment of the seal face pattern of FIG. 4. A sealing ring 136 is shown in elevational side view to show the seal face 140. Seal face 140 is comprised of an annular dam 142, identical to dam 42 (FIG. 3) and a grooved portion 144. Again, the dam 142 is not absolutely necessary since the grooves of the grooved portion 144 are not continuous from the inner edge of grooved portion 144 to its outer edge. This structure does not provide a leak path for the fluid under pressure, and the seal is maintained between the seal faces when the shaft 12 is not rotating, i.e. the static seal condition.

The annular grooved portion 144 preferably comprises a pattern of lands and grooves, similar in most respects to the pattern of lands and grooves in annular grooved portion 44 (FIG. 3). The difference is that the grooved portion 144 further comprises annular bands of circularly adjacent lands 146 which have an increasingly smaller width depending on the location of that band with radially inward measurements of the band width.

The width of any singular annular band of circumferentially adjacent lands 146, separated by corresponding grooves 148, is in effect the geometrical "height" of the lands 146 which when taken together, comprise the annular band. The "height" of a land 146 is not a true geometrical height of a triangle because of the slightly circular arcs which comprise the sides 152,154 of these lands 146. The "height" is thus defined as the radial dimension which extends from the intersection point 156 to the triangle base 150. The circumferentially adjacent lands 146 all have identical heights H, thus the radial width of the annular band comprising, for example, the outermost band of lands 146, is of identical dimension H.

The radially inward band, i.e., the second outermost band of lands 146', has a different "height" H'. The third outermost land band of lands 146" has a "height" of H" and so on.

It should be noted, however, that the outermost set of lands 146 in this embodiment are entrance lands 146, like that in the embodiment of FIG. 3, are truncated. That is, the outermost triangular lands 146 do not have coextensive bases 150, but are separated by a groove 148 which is in the shape of a "trapezoid" groove with slightly circular sides. The entrance lands 146 provide the same function which is to impel or "pump" fluid inwardly between the seal faces.

The heights H, H', H", etc. of the embodiment shown in FIG. 5 are in an inverse logarithmic progression. That is, the "height" of successively inward lands decreases inversely by a logarithmic function using the relative position of a particular band within the structure as outermost, second outermost etc. The innermost annular band, comprising the lands closest to the annular dam 142, have the smallest height. This structure does not provide the smooth arcs of continuous forwardly or rearwardly sloping triangle sides 152,154 which together form broken "spirals" from the outer edge to the inner edge of the grooved portion 144. Because of the decreasing annular band width, as the measurements are taken closer toward the inner edge, the spirals are not smooth but the slight discontinuities encountered are not believed to affect the operational characteristics of the seal face 140.

In respect to certain sealing environments, a dam portion may not be necessary. For example, in the aforementioned U.S. Pat. No. 5,090,712, the microdams provide a full barrier to fluid leakage from between the seal faces when the shaft is not rotating. That is, because the microdam surfaces are at the same height relative to the grooves, there is a static seal which forms when the microdam surfaces are brought against the corresponding opposite seal face, as is discussed above.

Figure 6:
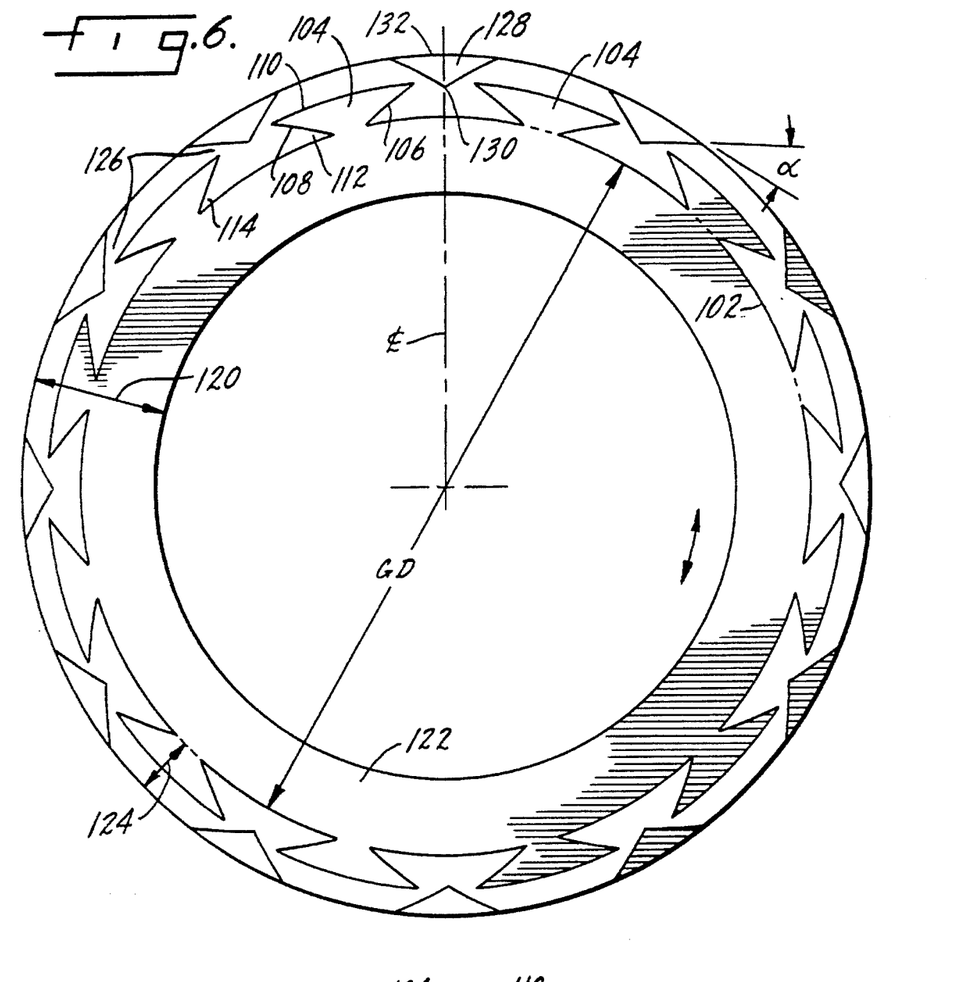
FIG. 6 is a detail view of a portion of the seal face of FIG. 5.
Figure 7:
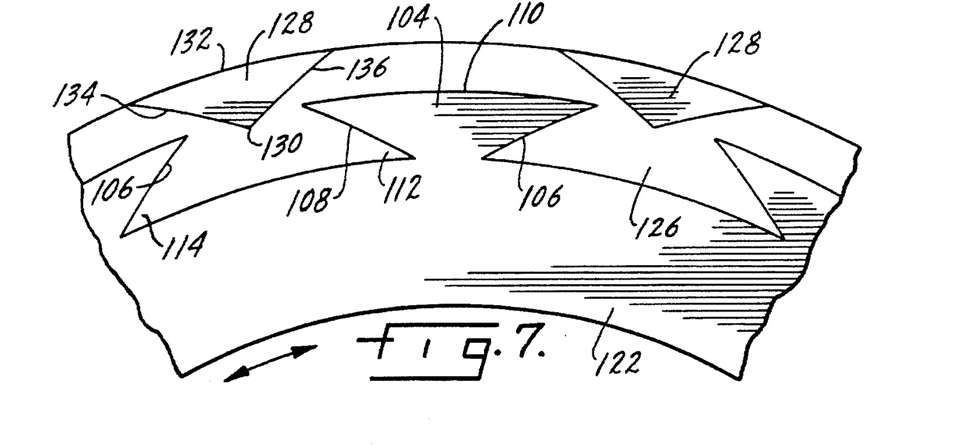
FIGS. 7 and 8 are additional embodiments of a seal face according to the present invention.

Referring now to FIGS. 6 and 7, FIG. 6 is an elevational view of the face 120 of the sealing ring which illustrates a pattern of grooved and land surfaces having a dual symmetry and providing the capability of the seal face rotating in either a clockwise or counterclockwise direction. FIG. 7 is a detailed view of one portion of the seal face 120 according to this invention. As in previously described embodiments, the seal face 120 preferably includes an annular dam portion 122 and a grooved portion 124 indicated by grooves and lands. The annular dam portion 122 is substantially the same as the dam portion of the conventional sealing ring shown in FIG. 2, and is bounded by a circle having a diameter GD defining the boundary between the grooved portion 124 and the dam portion 122. As in the other embodiments, relative ratios of the dam portion and the grooved portion may be determined for optimum operational characteristics of the seal.

The grooved portion 124 has itself two types of surfaces, a grooved surface 126 and two different types of land surfaces 128,104. The grooved surface 126 is preferably contiguous, that is, a winding path can be followed around the periphery of the annular grooved portion 124 and between the two different sets of lands 128,104. That path can wind along the grooved surface 126 completely around the seal face 120 while remaining at all times within the grooved surface 126.

Land surfaces within the grooved portion 124 are comprised of at least two separate and distinct types of land surfaces 128, 104. One type is a triangular land surface 128 which is basically in the form of an isosceles triangle having its point 130 closest to the axial center line of the seal ring face 120. This land surface 128 has been described in U.S. Pat. No. 5,090,712 and also herein as an entrance land 128. A radial center line drawn through the point 130 and through the radius of the seal ring 120 shows a radial symmetry on either side of the center line. For example, isosceles triangular land 128 has a triangle base 132 radially opposed to point 130 and has two other sides 134,136, which are equal in length to each other on either side of the centerline.

The side 132, construed as the triangle base of the isosceles triangle, is contiguous with the outer diameter of the seal ring face 120. The triangular land surface 128 is not triangular in the strict sense, but is substantially triangular with sides comprising slightly curved arcs, as in the embodiments of FIGS. 3 and 5. These slightly curved arc sides 132,134,136 define the substantially triangular boundary of land 128.

However, the grooved portions of the seal ring face 120 do not necessarily follow the shape of a spiral groove, as in the embodiments described in U.S. Pat. No. 5,090,712. For example, the slightly curved sides 134,136 of equal length may not necessarily by curved, but may be straight, in an alternate embodiment (not shown).

The substantially triangular lands 128 are disposed around the circumferential edge of the seal ring face with the triangle base 132 of each of the entrance lands 128 coinciding or being contiguous with the edge of the ring circumference as stated above. The isosceles sides 134,136 of each of the entrance lands 128 are either forwardly inclined or rearwardly inclined relative to the circumferential edge of the seal ring.

These sides 134,136 each define an intersecting angle α with the circumferential edge of the sealing ring. The intersecting angle α which is defined by a tangent to the circumferential edge of the sealing ring and the intersecting sides 134,136, whether rearwardly or forwardly inclined, provide an entrance effect to the seal ring upon shaft rotation in one of the respective clockwise or counterclockwise directions. The angle α defined by the circumferential edge and the intersecting isosceles side is preferably about 5 degrees to about 90 degrees, and preferably about 15 degrees.

The entrance lands 128 are preferably evenly disposed around the circumference of the seal ring 120 so that the angular distance between any two adjacent entrance lands 128 is identical. That is, a center line drawn through each of the intersecting points 130 of the two isosceles sides 134,136 illustrate that any two adjacent entrance lands 128 are at the same angular displacement relative to each other as any other two adjacent entrance lands 128. The number of entrance lands 128 will normally vary with the diameter of the shaft which the seal is intended to use. Preferably, for a shaft having a four inch diameter, there are twelve of the entrance lands 128 and the center lines drawn through each of their points 130 are 30 degrees apart from any adjacent entrance land 128.

The grooved areas surrounding the entrance lands 128 is preferably a continuous belt winding all the way around the periphery of the annular grooved area 124. The annular grooved area 124 has a virtual border which is discontinuous and an inner diameter boundary line 102. The inner diameter boundary line is defined by a diameter GD, as described above and further shown by phantom lines.

The inner diameter boundary lines 102 are discontinuous in that lands 104 appear to break the continuity of the lines 102. The lands 104 are at a height relative to the surface of the seal face 120 which is substantially the same as that of the dam 122.

Lands 104 do not have a contiguous area which touches either the entrance lands 128 or the outer diameter circumference of the seal face 120. The radially extending sides 106, 108 which extend in opposite directions relative to each other when compared with the outer peripheral circumference of the annular grooved area 124. In the preferred embodiment, the inner section of each of the radially extending sides 106,108 meet the inner diameter periphery of the angular grooved portion 120 at points which are separate from each other by a substantial space approximately on the order of one-half the length of each of the sides 106,108. In the preferred embodiment, a side 110 which is slightly curved circumferentially extending arc joins the divergent opposite ends of the radially extending lines 106,108. Although side 110 is shown unbroken in a continuous line between the two end points of the sides 106,108, other configurations, such as groove breaks or smaller groove areas can be incorporated into the land 104 without detracting from the essential operation of the seal face as will be explained below.

A plurality of lands 104 are disposed in a circumferential pattern at the same radial distance from the center of the seal face 120 such that each land 104 is disposed between a pair of adjacent entrance lands 128. The lands 104 may be considered as being truncated triangularly shaped patterns which are directly attached to the dam 122. As with the entrance lands 128, lands 104 have curving slightly arced sides which define lands 104. It should be noted that the virtual intersection point between the sides 106 and 108 would have been disposed within the dam portion 122. However, because the land 104 and the dam 122 are at the same relative heights as compared to the continuous groove 126, there is no discontinuity between the surface of the land 104 and the dam 122.

The entrance lands 128 perform the identical function in this embodiment as they do in the embodiments shown in FIGS. 3 and 5. That is, they direct fluid from outside of the circumference of the seal face into and between the seal faces so as to maintain a gap between the seal face 120 and the opposite mating ring seal face as discussed above relative to FIG. 1. The fluid is directed inwardly from the circumference within the groove 126 and is directed into a grooved area 112 which is between two adjacent lands 104. It should be noted, that the sides 134 of an entrance land for a ring which is rotating in the counterclockwise direction will be circumferentially ahead of an associated side 108 of the land 104. Thus, the fluid is being pumped from the outer circumference by the entrance land 128 into a grooved area 112, is then further pumped by the associated side 108 and is pumped inwardly toward a trailing corner of the grooved area 112. Of course, for rotation in the opposite direction, the associated sides 136 will pump fluid into the grooved area 126 and will then be further pumped into the opposite trailing corner of groove 114 by the oppositely disposed side 106 of land 104.

Figure 8:
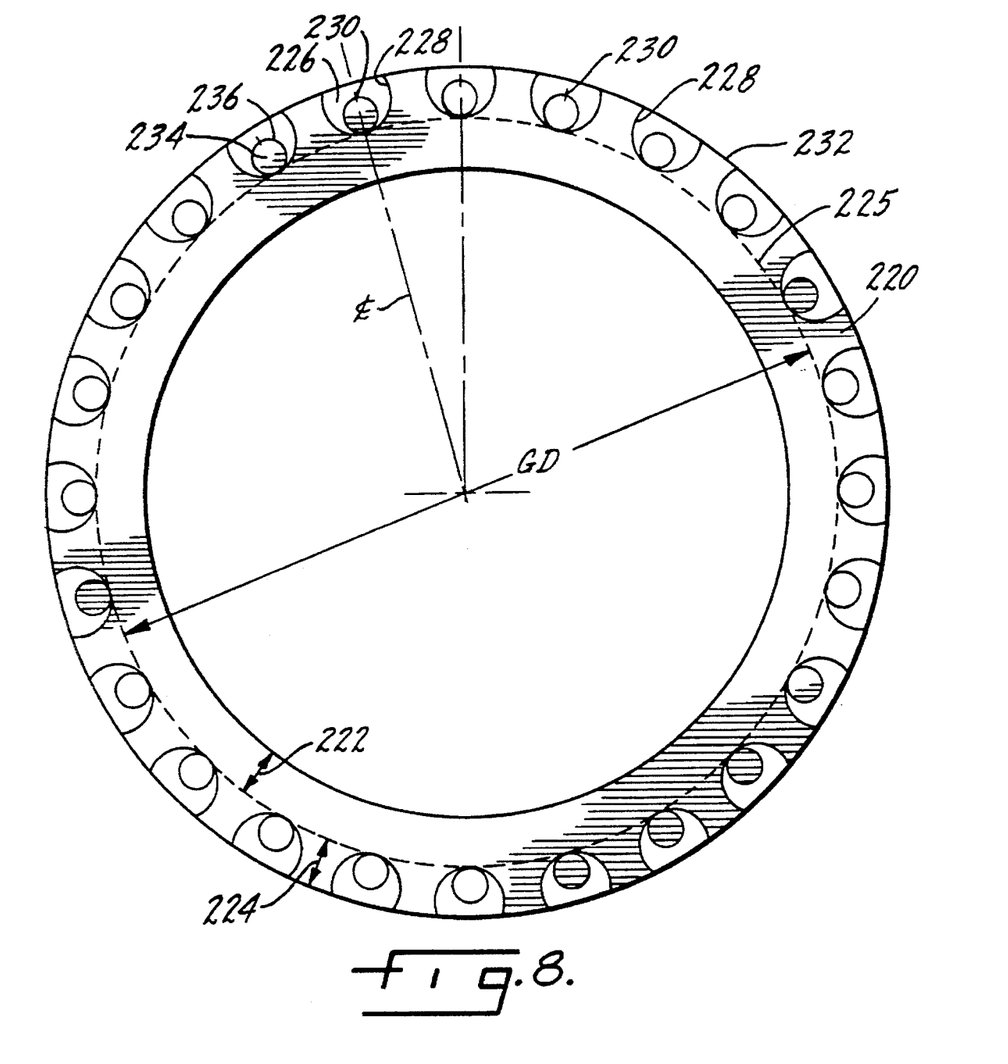

Referring now to FIG. 8, another embodiment of a bidirectional seal face pattern 220 comprising a dam 222 and a groove portion 224 defined in part by a phantom dotted line 225 which separates the two. Dam 222 is substantially identical to the other dams described above.

Groove portion 224, however, comprises a plurality of grooves 226. The grooves 226 preferably comprise semicircular or elliptical areas defined by a semi-circular or elliptical boundary 228 having a locus (or loci) 230 which is radially inward of the circumferential edge 232 of the grooved portion 224. However, the semicircular boundary 228 may be elliptical or another shape, as will be discussed below.

Disposed within the groove 226 is a land 234, preferably having a circular or elliptical boundary 236 separating it from the groove 226. The inwardly radial side of the boundary 236 is contiguous with the inwardly radial side of the boundary between both the groove 226 and lands 234 and also contiguously tangent to the phantom dotted line 225 between the annular groove portion and the dam 222.

The shape or boundary 228 of either the groove 226 or of the land 234 having a boundary 236 may take other forms than those illustrated. The feature of the land 234 may also take other shapes than the preferred ellipse or circle, and may comprise, for example, a diamond shape, as long as the groove 226 provides for convergent boundaries 228,236 as it approaches the inner diameter edge 225 of the grooved portion 224.

It should be noted that the locus (or loci) 230 of the boundary line 228 can be at different offset points from the circumferential edge 232 such that the angle between the boundary of the groove 228 and the circumferential edge 232 presents an acute angle relative to that circumferential edge 232. Angles of curved or slightly curved arc sections are defined in accordance with the definition described above. That is, that an intersection of two curved sections is first determined, and a tangent of each of the two curved sections is taken at that point. The included angle between the two tangents of these curved sections is then the referenced angle.

With regard to the angle of the semicircular or elliptical boundary 228 and the circumferential edge 232, the intersection of the two is at an acute angle relative to the direction of rotation so that the land 234 provides an entrance land effect, similar to the other embodiments disclosed in accordance with the present and previously described inventions. Because of the symmetry of each of the grooves 226 about a centerline, shaft rotation in either direction will provide an entrance land effect regardless of the direction of rotation of the shaft.

Once the fluid is pumped inwardly from the circumferential edge 232 within the groove 226, a pressure build-up results adjacent the intersection points of the semicircular or elliptical boundary 228 of groove 226 and the circular or elliptical boundary 236, where the fluid flow is constricted and concentrated. The fluid pressure buildup results in the creation of a gap between the seal faces, similar to the gap of other gap-type mechanical face seals.

The seal faces described above provide the capability for rotation of the shaft and sealing ring in either the clockwise or counterclockwise directions. Similarities to the earlier filed U.S. Pat. No. 5,090,712 are evident. For example, the embodiments of the triangular lands in concentric bands (FIGS. 3–5) also build pressure at the barriers at each intersection point and restrict fluid flow between the grooves. Also, all of the embodiments provide an entrance land effect which pumps fluid inwardly from a circumference and constrict and concentrate the fluid into a smaller area.

Figure 9:
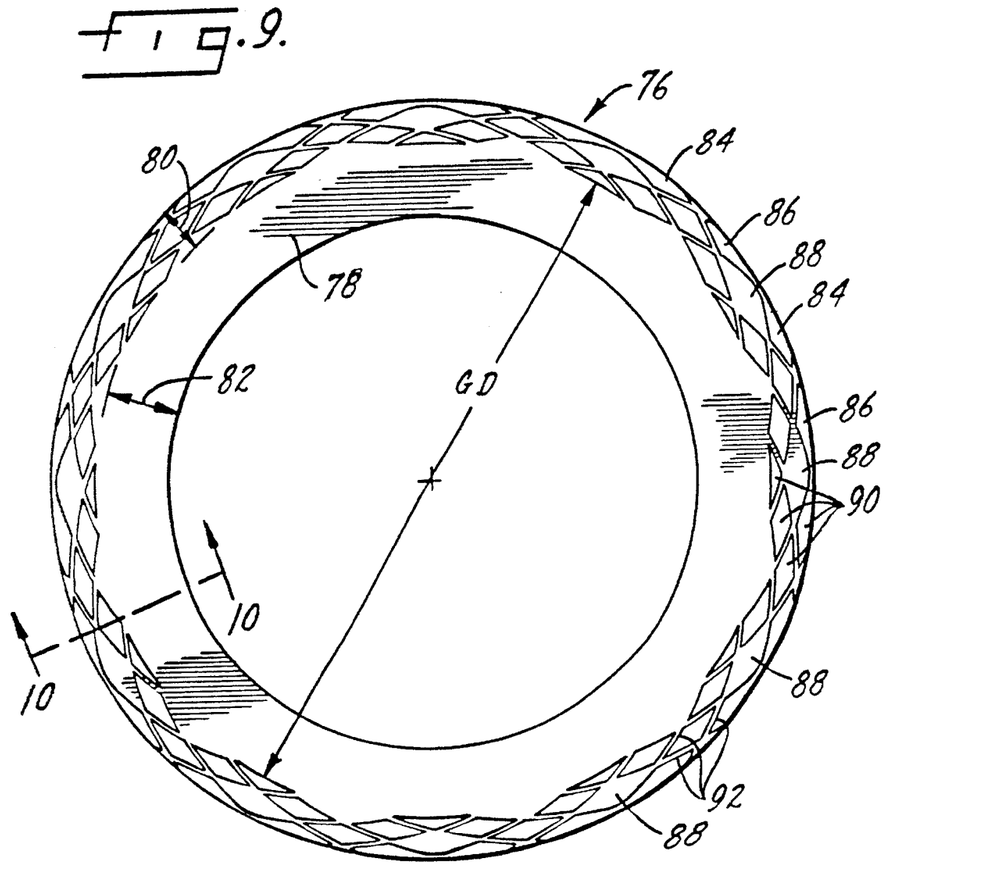
FIG. 9 is an end view of a sealing ring having a raised pattern configuration according to the present invention.
Figure 10:
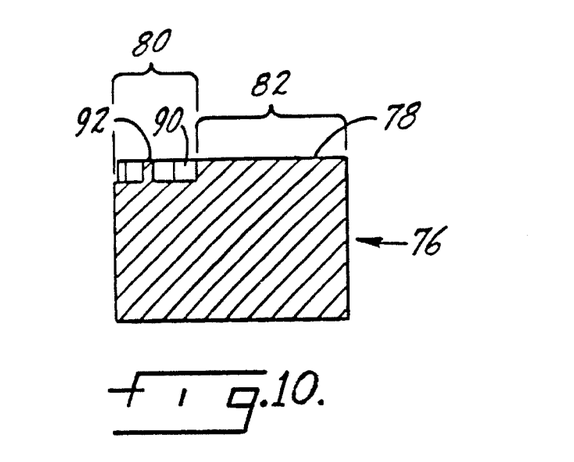
FIG. 10 is a cross-sectional view of the sealing ring illustrated in FIG. 9 taken along a line approximately at 10—10.

Referring now to FIGS. 9 and 10, there is illustrated a sealing ring 76 including a sealing face 78 utilizing the teachings of the present invention. Like the prior art sealing face 24 shown in FIG. 2, sealing face 78 comprises a groove portion 80 and a dam portion 82. The dam portion 82 is substantially the same as the dam portion shown in FIG. 2, and is bounded by a circle having a diameter GD defining the boundary between the groove portion 80 and the dam portion 82.

The groove portion 80, however, has several differences in relation to the groove portion of ring 26. These differences are significant features of the present invention and directly provide the advantages mentioned above.

One significant difference is that ring 26 provides grooves 70 which are asymmetrical relative to the circumferential direction of the sealing face. That is, groove portion 80 of seal ring 76 includes a set of forwardly directed grooves 84 as well as a set of rearwardly directed grooves 86, each separated by land areas. The two sets of grooves 84,86 intersect at discrete polygons 90 which define areas of the surface of groove portion 80, and each of the polygons 90 comprising these areas of intersection are bounded by microdams 92.

The microdams 92 can be any width commensurate with the requirement that each groove be capable of maintaining a fluid interface between the faces of the seal rings. A preferred width of the microdams 92 is approximately 0.025 inches for a seal adapted for use with a shaft having a diameter of 4 inches. The height of the microdams 92 relative to the face of seal ring 76 is preferably the same height as the dam portion 82 and the land areas 88, as shown in FIG. 10. All the ungrooved surfaces, i.e. the dam portion 82, the land areas 88 and the microdams 92 are in the same plane.

The seal pattern illustrated in FIG. 9 shows a spiral groove pattern on the seal face, but other groove path patterns are also contemplated for use with this invention. For example, the grooves may be straight and disposed tangentially to the inner diameter circumference. Alternatively, the grooves may be disposed at various angles relative to the inner diameter circumference or different grooves may be disposed in a combination of angles.

Figure 11:
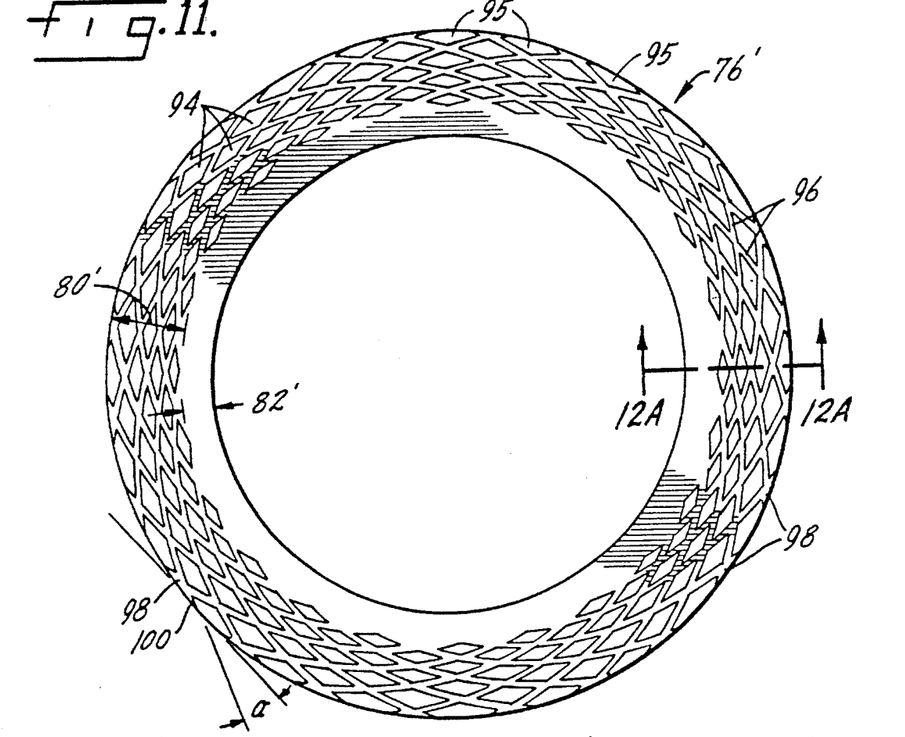
FIG. 11 is an end view of an alternate embodiment of sealing ring having a raised pattern configuration according to the present invention.

Another preferred embodiment of the present invention is a seal face pattern which provides a surface with microdams in substantially the same plane and which further have only grooved surfaces between the microdam surfaces. FIG. 11 illustrates a ring 76' having a seal face pattern according to this embodiment where the groove portion 80' comprises a substantially greater radial dimension than the dam portion 82' than does the corresponding dimensions 80,82 of the embodiment illustrated in FIG. 9. This difference in relative radial dimension translates into a surface area of the annular grooved portion 80' which is Significantly greater than the surface area of the annular dam portion 82'.

Another major difference from the embodiment of FIG. 9 is that the pattern of the embodiment of FIG. 11 lacks land areas, such as the land areas 88 illustrated in FIGS. 9 and 10. The surface of the groove portion 80' is effectively a lacework pattern of forwardly and rearwardly inclined spiral microdams 96 on a planar grooved surface. The spiral microdams 96 define polygonal surfaces such as the four-sided polygons 94, shaped substantially like diamonds, and three-sided polygons 98, shaped substantially like triangles. These surfaces are depressed or grooved areas which are below the plane of the microdam surfaces. The grooved polygonal surfaces 94 and 98 are at a depth of approximately 200–400 microinches, which is deeper than the groove depth of conventional grooves 70 of the ring 26 shown in FIG. 2. The depth of the various surfaces 94,98 may be uniform, but uniformity of the grooved surfaces is not necessary.

Another feature of the embodiment shown in FIG. 11 is the three-sided polygonal surfaces 98 at the edge of the seal face. These surfaces are defined by microdams 96 that form an oblique angle with the edge of the surface. It has been determined that if these surfaces 98 are not grooved but are in the same plane as the surface of the microdams 96 surfaces, then rotation of the ring in either the clockwise or the counterclockwise directions provides a greater capability of the ring to pump fluid from the edge of the ring where these surfaces are disposed toward the center of the annular grooved portion 80'. The pumped fluid then maintains an adequate stiffness and thickness to maintain the proper gap between the seal faces. Moreover, the microdam structure and polygonal four-sided surfaces 94 maintain a sealing capability which substantially reduces fluid leakage through the gap between the seal faces.

The width of the microdam 96 measured at the planar surface can be in a range of from about 0.001 to about 0.100 inches, with the preferable width being above 0.025 inches. As is discussed above, the grooved surfaces are at a depth of between about 50 to about 800 microinches with the preferable depth being approximately 350 microinches.

In a preferred embodiment, the ring material is tungsten carbide and the ring 76' is used as the rotating, mating ring, similar to ring 26 of the seal shown in cross section in FIG. 1. The grooved surfaces are produced by methods known to those skilled in the art.

Figure 12A:
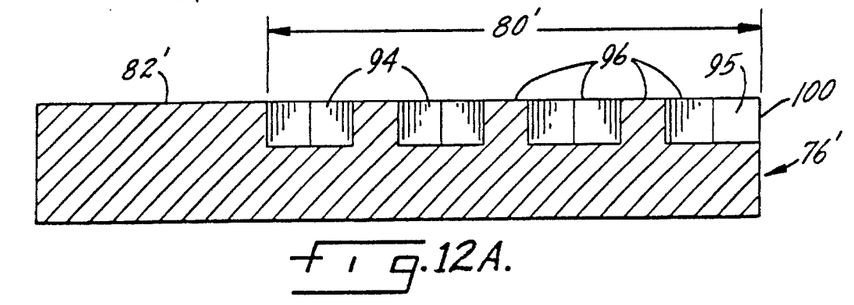
FIG. 12A is an expanded cross-sectional view of the sealing ring embodiment illustrated in FIG. 11 taken along a line approximately at 12—12.
Figure 12B:
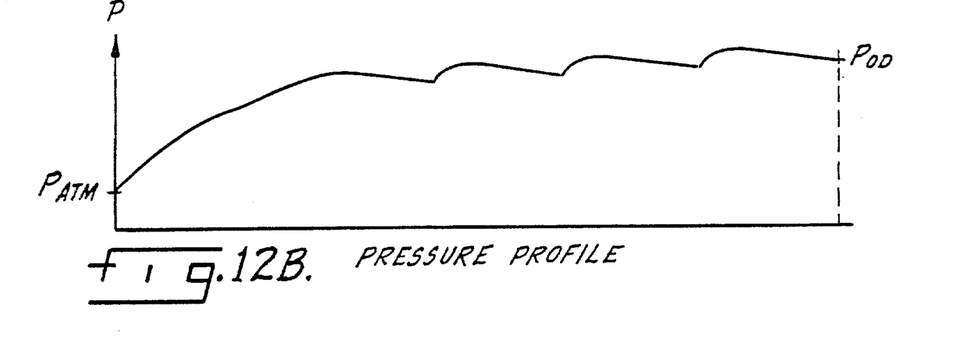
FIG. 12B is an approximate plot of the pressure profile of the raised pattern of FIG. 12A following approximately similar dimensions along the X-axis.

FIG. 12A is an expanded cross-sectional view of the sealing ring 76' of FIG. 11. The cross-sectional view of FIG. 12A is expanded to provide a relative approximate plot of the pressure profile illustrated in FIG. 12B. FIGS. 12A and 12B are positioned one above the other so that there is a correspondence along the ordinate (X-axis) between the pressure profile of FIG. 12B and the radial position as taken from the inner diameter (I.D.) to the outer diameter (O.D.) of the ring shown in FIG. 11. It is to be understood that the pressure profile of FIG. 12B is only illustrative of the physical model of the ring 76' when in use. Because the separate polygonal grooved surfaces 94 are three-dimensional, it is not possible to represent in simple form the pressure profile of the grooved surface 94. Thus, the pressure profile of FIG. 12B is only an approximate rendering of a hypothetical cross-sectional slice taken through the ring 76'.

The pressure profile of FIG. 12B illustrates the relative pressures hypothetically taken at points along the surface of the ring 76'. The pressure at the inner diameter (I.D.) is atmosphere pressure, and is indicated by $P_{ATM}$. The pressure at the outer diameter (O.D.) is at the sealed pressure and is indicated by $P_{OD}$.

As in all conventional gap type seals, the fluid being sealed, located at the O.D. in this illustrative embodiment, leaks through the gap and over the surface of the ring from the high pressure, here the O.D., side toward the atmospheric ($P_{ATM}$) pressure, which is at the I.D. The fluid at the O.D. is impelled inwardly by the raised triangular ungrooved surfaces 98, in an entrance effect created by pumping action. Reference to FIG. 11 will show that there is an acute angle $\alpha$ between an edge 100 of the triangular surface and the circumference of the O.D. which ideally suits the intended "pumping" function of the surfaces 98. A preferred range of angles for $\alpha$ which will work with the arrangement are between 10° and 30°, and the preferred embodiment will have an angle $\alpha$ equal to about 15°. As the ring rotates, the leading edges of raised or offset surfaces 98 act as skimmers on the fluid at the high pressure side and pump or impel the fluid inwardly from the circumference.

Referring again to FIGS. 12A and 12B, the fluid being pumped from the O.D. reaches the first or outermost microdam 96 which acts as a fluid barrier. The relative pressure is greater at the point closest to the outer wall of the microdam 96. The pressure then drops across the barrier formed by the microdam 96 until the inner wall of the microdam defining the next grooved surface 94 is reached.

It is understood that each microdam 96 is at an acute angle to the tangent normal to a given radius which touches the circumference of the seal face at that given radius. Thus, the fluid in each of the grooved surfaces 94 is pumped inwardly by the microdams 96 as the ring 76' rotates and a slight increase in pressure results from the inward pumping. As each microdam 96 acts as a barrier, there is a corresponding pressure drop across each microdam 96. The relative pressure in the grooved surfaces 94 also decreases as the measurements are taken at a surface from close to the outer diameter toward one at the inner diameter. The pressure barriers resulting from step decreases, generated by the microdams 96 as is shown in the pressure profile of FIG. 12B, provide for a minimum of fluid leakage across the surface of the ring 76'.

As in conventional groove face seals, the dam portion 82' experiences the greatest pressure drop across the surface and allows the pressure to drop to atmospheric pressure $P_{ATM}$. The pressure drop across the dam 82' is smaller, however, because the step decreases have reduced the relative pressures between the outer wall formed by the dam 82' and the inner diameter. The decrease in the amount of pressure drop further reduces the amount of total fluid leakage from a seal utilizing the inventive microdam structure.

The fluid pressure analysis made above with regard to the embodiment shown in FIGS. 11 and 12A would be applicable also to seal face pattern as shown in the embodiments of FIGS. 9 and 10. The differences in the structure, e.g. the land surfaces 88 provided in the embodiment of FIGS. 9 and 10, allow for more of a channeling of the fluid flow in a spiral direction as rotation is begun of the ring 76 shown in FIGS. 9 and 10. Otherwise the microdams achieve the same function of providing a series of step decreases in the pressure as taken from the outer diameter toward the inner diameter.

The microdams also provide the capability for rotation of the sealing ring in either the clockwise or counterclockwise directions. The microdams not only build pressure at the barriers, but also restrict fluid flow, such as air flow, from the atmosphere side toward the high pressure side.

Of course, other alternative arrangements will become apparent to a person of ordinary skill in the art after acquiring a full understanding of the present invention. For example, the microdams can be utilized in unidirectional, spiral groove seal faces. Other changes, such as placing the spiral grooves on the stationary ring or placing the dams 82 or 82' at atmospheric pressure at the outer diameter and having the pumping surfaces 98 at the inner diameter, are also within the scope of this invention.

Of course, other alternative arrangements will become apparent to a person of ordinary skill in the art after acquiring a full understanding of the present invention. The above-described embodiments are for purposes of illustration only, and the invention is not limited thereto.

What is claimed is:

1. A mechanical face seal for providing a seal between a pair of relatively rotatable components comprising a first sealing ring adapted to be mounted non-rotatably on one of said components and sealed with respect to said one component; a second sealing ring adapted to be mounted non-rotatably on the other component and sealed with respect to said other component, said second sealing ring being mounted in axial alignment with the first sealing ring; and means being provided for resiliently urging a seal face of the first sealing ring axially into sealing engagement with a seal face of the second sealing ring; at least one of the sealing rings including a seal face comprising:

an ungrooved dam portion extending inwardly from one circumference of said seal face of said at least one of the sealing rings; and an annular groove portion having a first and a second periphery defining a radial width W taken in a radial direction between the first and the second periphery, said second periphery being radially contiguous with said ungrooved dam portion, the groove portion comprising:

at least one continuous groove which is contiguously connected from said first periphery to said second periphery around the complete circumference of said annular groove portion, a plurality of spaced apart first lands disposed around said first periphery of the annular groove portion, each of said first lands being substantially triangular in shape and having at least three triangle sides, each triangle side comprising generally a shallow arc, one of said triangle sides defining a triangle base, which base is coextensive with said first periphery of said annular groove portion and is defined by an arc portion thereof, and an intersection point of said other two triangle sides, said intersection point being opposed along a generally radial direction relative to said triangle base, each of said first lands having a geometrical height $H_1$ as measured along a radius between said base and said intersection point, and a plurality of circumferentially spaced apart second lands disposed around a second periphery of the annular groove portion and being separated from said first lands by said continuous groove, each of said second lands essentially having a quadrilateral shape comprising at least four sides, each of said sides being defined by shallow arcs, a first of said sides being coextensive with said second periphery of said annular groove portion and being defined by an arc section thereof, and a second of said sides being opposed to and generally parallel to said first side and being radially separated therefrom, said second side comprising a shallow arc which is circumferentially disposed, said quadrilateral having a geometrical height $H_2$ defined as the radial dimension between said first and second sides, wherein at least one of said first lands is circumferentially disposed between two of said second lands and wherein the dimensions of said radial width W, and said geometrical heights $H_1$, $H_2$ are as follows $H_1 > 0$;

$H_2 > 0$; and $W - H_1 > H_2$.

2. The seal as in claim 1 wherein said first lands are entrance lands and the dimensions of said two other triangle sides of said first lands are approximately equal.

3. The seal as in claim 2 wherein one of said two other sides of said first lands are inclined relative to said first periphery at a predetermined angle and said one of two sides comprises a trailing edge and the other of said two sides comprises a leading edge, the reference of either depending on the direction of rotation of the shaft.

4. The seal as in claim 3 wherein said predetermined angle is in a range of from about 5° to less than 90°.

5. The seal as in claim 4 wherein said predetermined angle is approximately 15°.

6. The seal as in claim 1 wherein said geometrical heights $H_1$ and $H_2$ are approximately equal and both $H_1$ and $H_2$ are slightly longer than one-half of W.

7. The seal as in claim 1 wherein the relative height between the lands and the grooves is in a range of from approximately 25 microinches to approximately 1500 microinches.

8. The seal as in claim 7 wherein said relative height is approximately 350 microinches.

9. A seal face in a mechanical end face seal ring comprising an annular band having both groove and land areas adjacent each other, said groove area forming a continuous band being contiguously connected around the circumference of said seal face, said groove area having a plurality of first substantially triangular lands evenly spaced around the periphery of said seal face, said first triangular lands having two essentially isosceles sides meeting at a point of intersection and a slightly circular third side, said slightly circular third side being contiguous with the circular edge of the seal face, said groove area having a set of evenly spaced second truncated substantially triangular lands, one of said second truncated triangular lands being interposed between any two of said first triangular lands, each said second truncated triangular lands having a semicircular side closest to and concentric with the outer circumferential edge of said seal face and a truncated section being disposed closest to the inner diameter of the annular seal face, said point of intersection of said first triangular isosceles sides being disposed radially inwardly of said outer semicircular side of said second triangular lands.

10. In a gap-type, grooved face seal having a stationary sealing ring and a relatively rotating sealing ring with opposed radially extending faces, one of said rings being sealingly affixed to a housing and the other sealingly affixed to a shaft, and in at least one of said rings, a seal face including an ungrooved dam portion extending inwardly from one circumference of said seal face of said at least one of the sealing rings; the improvement characterized in an annular groove portion having a first and a second periphery defining a radial width W taken in a radial direction between the first and the second periphery, said second periphery defining a boundary between said annular grooved and ungrooved portions the groove portion comprising:

at least one continuous groove which is contiguously connected from said first periphery to said second periphery around the complete circumference of said annular groove portion, a plurality of spaced apart first lands disposed around said first periphery of the annular groove portion, each of said first lands being substantially triangular in shape and having at least three triangle sides, each triangle side comprising generally a shallow arc, one of said triangle sides defining a triangle base, which base is coextensive with said first periphery of said annular groove portion and is defined by an arc portion thereof, and an intersection point of said other two triangle sides, said intersection point being opposed along a generally radial direction relative to said triangle base, each of said first lands having a geometrical height $H_1$ as measured along a radius between said base and said intersection point, and a plurality of circumferentially spaced apart second lands disposed around a second periphery of the annular groove portion and being separated from said first lands by said continuous groove, each of said second lands essentially having a quadrilateral shape comprising at least four sides, each of said sides being defined by shallow arcs, a first of said sides being coextensive with said second periphery of said annular groove portion and being defined by an arc section thereof, and a second of said sides being opposed to and generally parallel to said first side and being radially separated therefrom, said second side comprising a shallow arc which is circumferentially disposed, said quadrilateral having a geometrical height $H_2$ defined as the radial dimension between said first and second sides, wherein at least one of said first lands is circumferentially disposed between two of said second lands and wherein the dimensions of said radial width W, and said geometrical heights $H_1$, $H_2$ are as follows:

$H_1 > 0$;

$H_2 > 0$; and $W - H_1 < H_2$.

11. A seal face pattern for at least one ring in a mechanical end face seal for sealing between a housing and a relatively rotating shaft, the seal comprising a first sealing ring sealingly attached to the housing and a second sealing ring sealingly attached to the relatively rotating shaft, the seal face comprising:

a generally planar surface extending outwardly from the inner circumference to the outer circumference of said ring face, the surface including at least two annular bands disposed radially sequentially on said seal face, each of said bands having an inner diameter and an outer diameter boundary, said annular bands comprising a radially inwardly disposed band and at least one annular band disposed radially outwardly of said radially inwardly disposed band, said at least two annular bands being radially adjacent each other, so that the inner diameter boundary of one band coincides with the outer diameter boundary of an adjacent band, each of said bands including a plurality of circumferentially adjacent, substantially triangular lands, each triangular land having a radially outwardly disposed base side and a relatively inwardly disposed first intersection point of the other two sides, said other two sides being essentially mirror images of each other and being disposed on opposite sides of a radial centerline which is taken through said first intersection point and the axial centerline of said seal face, the triangle base sides of circumferentially adjacent triangular lands in a radially inwardly disposed band being essentially contiguous having a common second intersection point, the first intersection point of said outwardly disposed band being coincident with said second common intersection point of said annular band which is immediately radially inwardly disposed; and an ungrooved portion extending inwardly from one of the circumference of the seal face of said at least one ring.

12. A seal in acccordance with claim 11 wherein each of the concentric annular bands has a radial width, and wherein the radial width of at least two of the concentric annular bands is approximately equal to the radial width of other annular bands.

13. A seal in acccordance with claim 11 wherein each of the concentric annular bands has a radial width, and wherein the radial widths of concentric annular bands decreases logarithmically for each of the successively inwardly disposed annular bands.

14. The seal as in claim 11 wherein the relative height between the lands and the grooves is in a range of from approximately 25 microinches to approximately 1500 microinches.

15. The seal as in claim 14 wherein said relative height is approximately 350 microinches.

16. The seal as in claim 11 wherein an annular band disposed adjacent a circumferential edge of said seal face comprises triangular lands which are entrance lands, and each of said other two triangle sides are oppositely inclined relative to said circumferential edge of said seal face at a predetermined angle, said predetermined angle being in a range from about 5° to about less than 90°.

17. The seal as in claim 16 wherein said predetermined angle is approximately 15°.

18. In a gap-type, grooved face seal having a stationary sealing ring and a relatively rotating sealing ring with opposed radially extending faces, one of said rings being sealingly affixed to a housing and the other sealingly affixed to a shaft, the seal being capable of sealing irrespective of the direction of shaft rotation, at least one of the seal rings of said seal having a seal face comprising:

an ungrooved portion extending inwardly from a first circumference and toward a second circumference of the seal face of said at least one ring; and a grooved portion extending from said second circumference of said seal face of said at least one ring, said grooved portion being adjacent said ungrooved portion and including a plurality of discrete essentially semicircular grooves being evenly spaced around said grooved portion and separated from each other by a plurality of lands, each said essentially semicircular groove being open at said second circumference, a locus of said essentially semicircular groove being disposed radially inwardly of said second circumference, each said groove further comprising within it an essentially circular land having a diameter smaller than that of said essentially semicircular groove and being disposed at the inner peripheral section of said groove, said outer peripheral section of said groove having two intersecting points with said second circumference of said seal face, such that each intersection of said outer peripheral section of said groove with said second circumference defining a predetermined acute angle with said second circumference to provide a fluid entrance effect.

19. The seal according to claim 18 wherein said predetermined angle is in a range of from about 5° to about 90°.

20. The seal according to claim 18 wherein said predetermined angle is approximately equal to about 15°.

* * * * *